United States Patent
Ueno et al.

(10) Patent No.: US 11,229,974 B2
(45) Date of Patent: Jan. 25, 2022

(54) METHOD OF WELDING ALUMINUM PLATED STEEL SHEET

(71) Applicant: G-TEKT CORPORATION, Saitama (JP)

(72) Inventors: Shoko Ueno, Tokyo (JP); Akihiko Uchida, Tokyo (JP)

(73) Assignee: G-TEKT CORPORATION, Saitama (JP)

( * ) Notice: Subject to any disclaimer, the term of this patent is extended or adjusted under 35 U.S.C. 154(b) by 516 days.

(21) Appl. No.: 15/777,645

(22) PCT Filed: Nov. 18, 2016

(86) PCT No.: PCT/JP2016/084234
§ 371 (c)(1),
(2) Date: May 18, 2018

(87) PCT Pub. No.: WO2017/086431
PCT Pub. Date: May 26, 2017

(65) Prior Publication Data
US 2018/0345407 A1    Dec. 6, 2018

(30) Foreign Application Priority Data
Nov. 19, 2015    (JP) .............................. JP2015-226668

(51) Int. Cl.
*B23K 26/242* (2014.01)
*B23K 26/322* (2014.01)
(Continued)

(52) U.S. Cl.
CPC .............. *B23K 26/242* (2015.10); *B23K 9/23* (2013.01); *B23K 11/16* (2013.01);
(Continued)

(58) Field of Classification Search
CPC ........ C12Q 2525/117; C12Q 2525/205; C12Q 2541/101; C12Q 1/6811; B23K 26/60;
(Continued)

(56) References Cited

U.S. PATENT DOCUMENTS

2006/0254388 A1* 11/2006 Nishii ..................... C23G 1/00
75/600
2007/0151948 A1* 7/2007 Kool ..................... F01D 5/005
216/83
(Continued)

FOREIGN PATENT DOCUMENTS

CN    101012565 A    8/2007
CN    104334349 A    2/2015
(Continued)

OTHER PUBLICATIONS

Office Action received for Chinese Patent Application No. 201680067642.0, dated May 27, 2019, 13 pages (7 pages of English Translation and 6 pages of Office Action).
(Continued)

*Primary Examiner* — Ibrahime A Abraham
*Assistant Examiner* — Dilnessa B Belay
(74) *Attorney, Agent, or Firm* — Womble Bond Dickinson (US) LLP (57) ABSTRACT

To enable welding in a state in which aluminum plating in a desired welding region is removed at a desired high accuracy, a plating layer (103) in a welding region (151) and a plating layer (104) in a welding region (152) are removed using an alkaline solution to form a preprocessed aluminum plated steel sheet (101*a*), and a plating layer (123) in a welding region (153) and a plating layer (124) in a welding region (154) are removed using an alkaline solution to form a preprocessed aluminum plated steel sheet (121*a*).

3 Claims, 6 Drawing Sheets

(51) Int. Cl.
  *B23K 9/23*    (2006.01)
  *B23K 11/16*   (2006.01)
  *B23K 26/21*   (2014.01)
  *C23F 1/36*    (2006.01)
  *C23F 1/02*    (2006.01)
  *B23K 26/60*   (2014.01)
  *B23K 26/00*   (2014.01)
  *B23K 26/26*   (2014.01)
  *B23K 103/04*  (2006.01)
  *B23K 101/00*  (2006.01)

(52) U.S. Cl.
  CPC .......... *B23K 26/0006* (2013.01); *B23K 26/21* (2015.10); *B23K 26/26* (2013.01); *B23K 26/322* (2013.01); *B23K 26/60* (2015.10); *C23F 1/02* (2013.01); *C23F 1/36* (2013.01); *B23K 2101/006* (2018.08); *B23K 2103/04* (2018.08)

(58) Field of Classification Search
  CPC .... B23K 9/23; B23K 26/242; B23K 26/0006; B23K 26/322; B23K 26/26; B23K 26/006; C23F 1/02; C23F 1/36
  See application file for complete search history.

(56) References Cited

U.S. PATENT DOCUMENTS

| | | | |
|---|---|---|---|
| 2011/0056914 A1* | 3/2011 | Andreoli | C23F 1/44 216/87 |
| 2013/0316185 A1* | 11/2013 | Evangelista | B23K 26/40 428/601 |
| 2015/0225570 A1 | 8/2015 | Konishi et al. | |

FOREIGN PATENT DOCUMENTS

| | | |
|---|---|---|
| CN | 104704148 A | 6/2015 |
| EP | 1803838 A2 | 7/2007 |
| EP | 2894241 A1 | 7/2015 |
| JP | 49-103844 A | 10/1974 |
| JP | 52-090431 A | 7/1977 |
| JP | 05-086094 U | 11/1993 |
| JP | 2007-182629 A | 7/2007 |
| JP | 5237263 B2 | 7/2013 |
| JP | 2014-025142 A | 2/2014 |
| JP | 5752319 B2 | 7/2015 |
| JP | 2015-523210 A | 8/2015 |
| WO | 2007/125182 A1 | 11/2007 |
| WO | 2013/177590 A1 | 11/2013 |

OTHER PUBLICATIONS

International Preliminary Report on Patentability received for PCT Patent Application No. PCT/JP2016/084234, dated May 31, 2018, 13 pages (8 pages of English Translation and 5 pages of Original Document).

Office Action received for Chinese Patent Application No. 201680067642.0, dated Dec. 16, 2019, 14 pages (9 pages of English Translation and 5 pages of Office Action).

Supplementary European Search Report and Written Opinion received for EP Patent Application No. 16866431.6, dated Jul. 16, 2019, 7 pages.

International Search Report and Written Opinion received for PCT Patent Application No. PCT/JP2016/084234, dated Dec. 20, 2016, 15 pages (8 pages of English Translation and 7 pages of Original Document).

\* cited by examiner

METHOD OF WELDING ALUMINUM PLATED STEEL SHEET

TECHNICAL FIELD

The present invention relates to a method of welding an aluminum plated steel sheet.

BACKGROUND ART

A part (vehicle body part) that constitutes a vehicle needs to have a high strength. For this reason, as a material for forming such a part, a steel sheet having, for example, a high strength such as a high-tensile steel sheet is used. However, since the steel sheet is press-worked into a vehicle body part, when a steel sheet having a high strength is used, a problem of, for example, a dimensional accuracy error readily occurs in press working. The higher the strength of the steel sheet being used, the more evident the problem becomes.

To solve the above-described problem, a called hot press has been developed. In hot press, a steel sheet is heated and softened, and then press-worked in this state. At the same time, the steel sheet is brought into contact with a mold and thus cooled so as to be hardened, thereby forming a vehicle body part with a high strength and a high dimensional accuracy.

Conventionally, a zinc-based plated steel sheet is generally used for a vehicle body part to obtain a corrosion resistance. However, in the above-described hot press, the steel sheet is heated to 700° C. to 1,000° C. that is a temperature close to or more than the boiling point of zinc. Hence, the hot press cannot be used for a zinc-based plated steel sheet. For this reason, in the hot press, an aluminum-based plated steel sheet (aluminum plated steel sheet) is used.

As a press material used for a vehicle body part, a TWB (Tailored Welded Blank) is used. The TWB is a press material formed by integrating a plurality of steel sheets of different board thicknesses or materials by laser welding before press. Since a plurality of steel sheets are integrated in the TWB, the board thickness or the like can freely be changed in one press material, and the function of a formed vehicle body part can be improved. Additionally, when the TWB is used, the number of vehicle body parts can be decreased.

However, in a TWB using an aluminum plated steel sheet, the strength at a welding point lowers after hot press. The above-described problem arises because aluminum that forms a plating layer is mixed at the welding point, and a high strength cannot be obtained by hardening in the hot press.

To solve the above-described problem, a technique of removing aluminum plating in a desired welding region using a laser beam is proposed (see patent literature 1). There is also proposed a technique of removing aluminum plating in a desired welding region using a scraping knife (see patent literature 2).

RELATED ART LITERATURE

Patent Literature

Patent Literature 1: Japanese Patent No. 5237263
Patent Literature 2: Japanese Patent No. 5752319

DISCLOSURE OF INVENTION

Problem to be Solved by the Invention

In both techniques, however, it is impossible to remove aluminum plating in a desired welding region at a desired high accuracy and execute welding. For example, when the removing amount is small in the thickness direction of the aluminum plating layer, mixing of aluminum occurs at the welding point during hardening. This also applies to a case in which a narrow removing region is used. In addition, in carrying out removing of the plating layer, when the removing amount is too large in the thickness direction, the steel sheet portion is also undesirably removed. As a result, the board thickness becomes thinner, and the strength at the welding point becomes lower. Furthermore, when the removing region is too wide, a wide region in which the aluminum plating layer is not being formed is formed after welding. This causes corrosion, yet again resulting in lowering of the strength.

The present invention has been made to solve the above-described problems, and has as its object to enable welding in a state in which aluminum plating in a desired welding region is removed at a desired high accuracy.

Means of Solution to the Problem

According to the present invention, there is provided a method of welding an aluminum plated steel sheet, including the first step of forming a preprocessed aluminum plated steel sheet in which a plating layer made of aluminum in a welding region is removed by an alkaline solution and the second step of welding, by laser welding, another member made of steel to the welding region of the preprocessed aluminum plated steel sheet to integrate the member and the preprocessed aluminum plated steel sheet.

In the method of welding the aluminum plated steel sheet, in the first step, the plating layer in the welding region is removed by the alkaline solution using a mask having an opening in the welding region.

In the method of welding the aluminum plated steel sheet, in the first step, a first preprocessed aluminum plated steel sheet in which the plating layer in the welding region of a first aluminum plated steel sheet is removed by the alkaline solution is formed, and a second preprocessed aluminum plated steel sheet in which the plating layer in the welding region of a second aluminum plated steel sheet that is the other member is removed by the alkaline solution is formed, and in the second step, the welding regions of the first preprocessed aluminum plated steel sheet and the second preprocessed aluminum plated steel sheet are butted against each other and welded by laser welding, thereby forming a tailored welded blank in which the first preprocessed aluminum plated steel sheet and the second preprocessed aluminum plated steel sheet are integrated.

Effect of the Invention

As described above, according to the present invention, a plating layer made of aluminum in a welding region of an aluminum plated steel sheet is removed by an alkaline solution. It is therefore possible to obtain an excellent effect of enabling welding in a state in which aluminum plating in a desired welding region is removed at a desired high accuracy.

BEST MODE FOR CARRYING OUT THE INVENTION

An embodiment of the present invention will now be described with reference to the accompanying drawings. FIGS. 1A to 1F are views showing states in steps to explain a method of welding an aluminum plated steel sheet according to the embodiment of the present invention. FIGS. 1A to 1F schematically show cross sections.

Figure 1A:
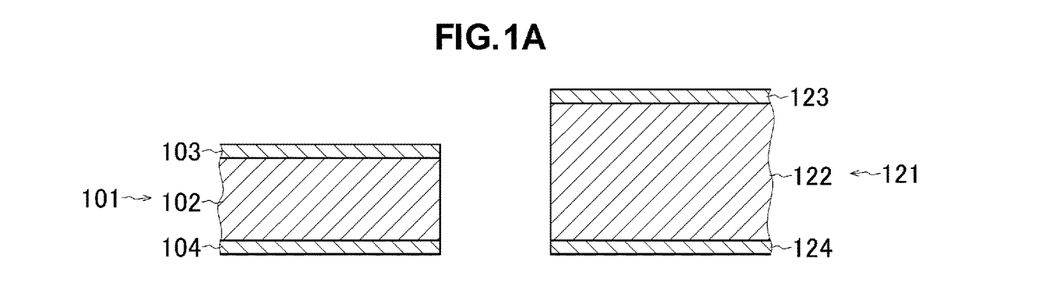
FIG. 1A is a view showing a state in each step so as to explain a method of welding an aluminum plated steel sheet according to an embodiment of the present invention.

First, as shown in FIG. 1A, an aluminum plated steel sheet 101 and an aluminum plated steel sheet (another member) 121 are prepared. The aluminum plated steel sheet 101 is formed from a steel sheet 102, and a plating layer 103 and a plating layer 104 which are formed on the obverse surface and the reverse surface of the steel sheet 102. The aluminum plated steel sheet 121 is formed from a steel sheet 122, and a plating layer 123 and a plating layer 124 which are formed on the obverse surface and the reverse surface of the steel sheet 122. Each plating layer is made of aluminum. In this example, the steel sheet 122 is assumed to have a board thickness larger than that of the steel sheet 102.

Figure 1B:
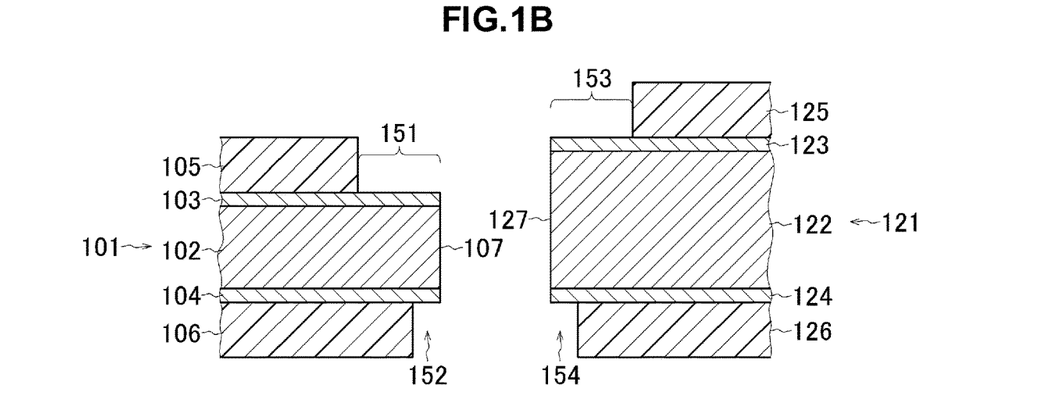
FIG. 1B is a view showing a state in each step so as to explain the method of welding an aluminum plated steel sheet according to the embodiment of the present invention.

Next, as shown in FIG. 1B, a mask layer 105 is formed on the plating layer 103 on the obverse surface side of the aluminum plated steel sheet 101, and a mask layer 106 is formed on the plating layer 104 on the reverse surface side. The mask layer 105 makes a welding region 151 open on the side of the plating layer 103 of the aluminum plated steel sheet 101 and covers the plating layer 103 in the remaining region. In addition, the mask layer 106 makes a welding region 152 open on the side of the plating layer 104 of the aluminum plated steel sheet 101 and covers the plating layer 104 in the remaining region.

Furthermore, a mask layer 125 is formed on the plating layer 123 on the obverse surface side of the aluminum plated steel sheet 121, and a mask layer 126 is formed on the plating layer 124 on the reverse surface side. The mask layer 125 makes a welding region 153 open on the side of the plating layer 123 of the aluminum plated steel sheet 121 and covers the plating layer 123 in the remaining region. In addition, the mask layer 126 makes a welding region 154 open on the side of the plating layer 124 of the aluminum plated steel sheet 121 and covers the plating layer 124 in the remaining region.

Note that in this example, an end (end surface) 107 of the aluminum plated steel sheet 101 and an end 127 of the aluminum plated steel sheet 121 are butted against each other and welded, as will be described later. Hence, the welding regions 151 and 152 extend from the position of the end 107, and the welding regions 153 and 154 extend from the position of the end 127.

Figure 1C:
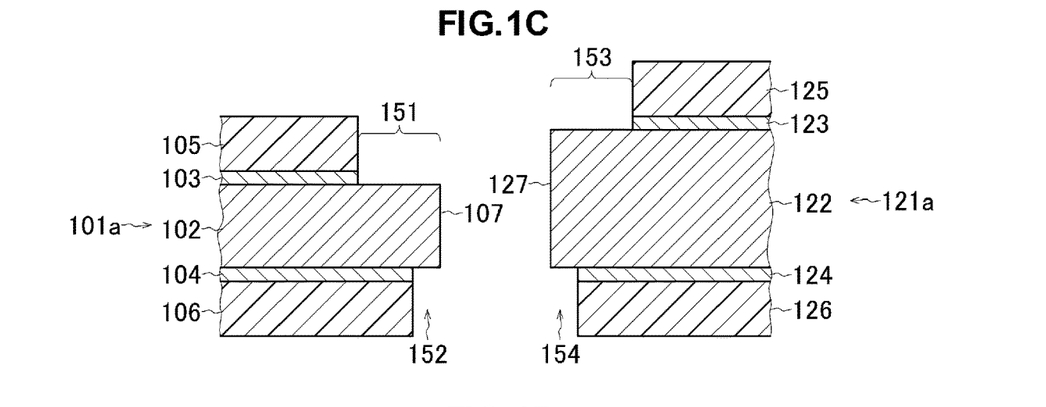
FIG. 1C is a view showing a state in each step so as to explain the method of welding an aluminum plated steel sheet according to the embodiment of the present invention.

Next, the plating layer 103 in the welding region 151 and the plating layer 104 in the welding region 152 are removed using an alkaline solution to form a preprocessed aluminum plated steel sheet 101a, as shown in FIG. 1C. In addition, the plating layer 123 in the welding region 153 and the plating layer 124 in the welding region 154 are removed using an alkaline solution to form a preprocessed aluminum plated steel sheet 121a, as shown in FIG. 1C.

Since the mask layers 105 and 106 are being formed, by having, for example, the entire region of the aluminum plated steel sheet 101 immersed in an aqueous solution of sodium hydroxide of a predetermined concentration, the plating layers 103 and 104 in the welding regions 151 and 152, which are not covered with the mask layers 105 and 106, are removed. In addition, since the steel sheet 102 does not dissolve in the alkaline solution, the plating layers 103 and 104 in the welding regions 151 and 152 are selectively removed.

Similarly, since the mask layers 125 and 126 are being formed, by having, for example, the entier region of the aluminum plated steel sheet 121 immersed in an aqueous solution of sodium hydroxide of a predetermined concentration, the plating layers 123 and 124 in the welding regions 153 and 154, which are not covered with the mask layers 125 and 126, are removed. In addition, since the steel sheet 122 does not dissolve in the alkaline solution, the plating layers 123 and 124 in the welding regions 153 and 154 are selectively removed.

Figure 1D:
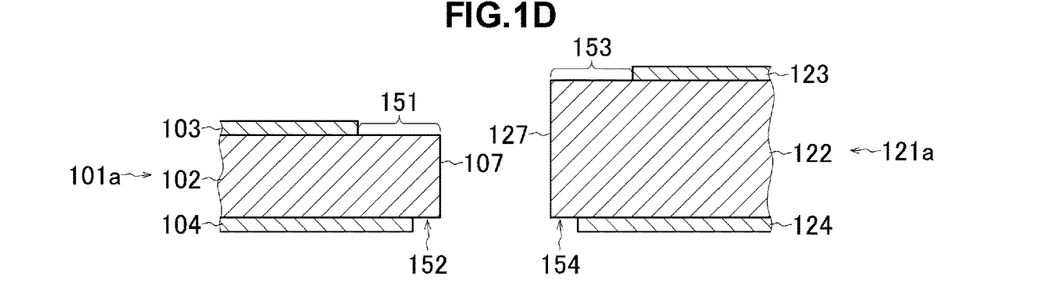
FIG. 1D is a view showing a state in each step so as to explain the method of welding an aluminum plated steel sheet according to the embodiment of the present invention.

Next, the mask layers 105, 106, 125, and 126 are removed to expose the surfaces of the plating layers 103, 104, 123, and 124 which are left out and unremoved, as shown in FIG. 1D.

Figure 1E:
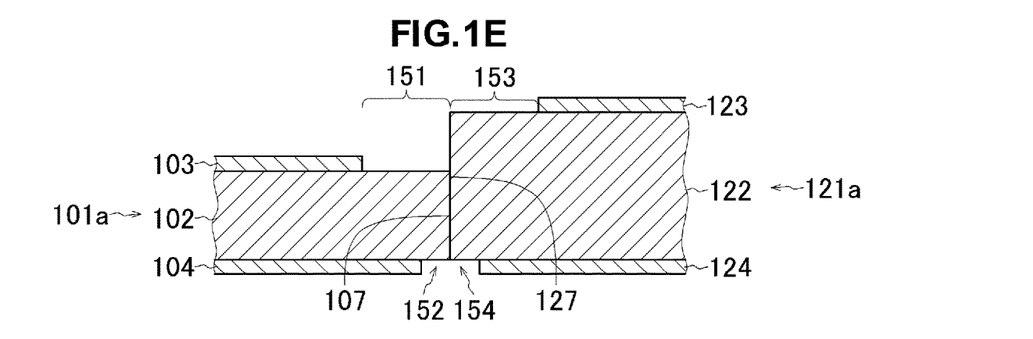
FIG. 1E is a view showing a state in each step so as to explain the method of welding an aluminum plated steel sheet according to the embodiment of the present invention.
Figure 1F:
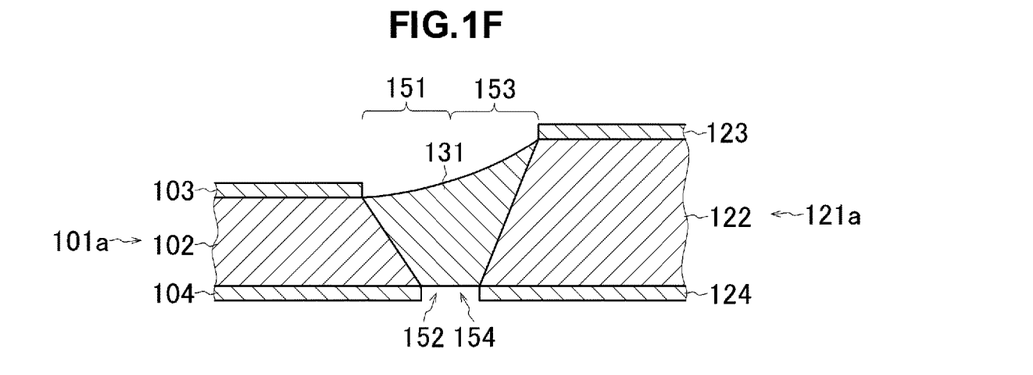
FIG. 1F is a view showing a state in each step so as to explain the method of welding an aluminum plated steel sheet according to the embodiment of the present invention.

Next, as shown in FIG. 1E, the end 107 of the aluminum plated steel sheet 101 and the end 127 of the aluminum plated steel sheet 121 are butted against each other. Then, for example, the welding regions 151 and 153 are irradiated with a laser beam and thus welded, and a state in which the aluminum plated steel sheets 101 and 121 are integrated in a welding portion 131, is obtained, as shown in FIG. 1F.

As described above, when the two steel sheets are welded and integrated, a tailored welded blank is obtained. In addition, when the produced tailored welded blank is used, a vehicle body part having a desired shape can be obtained by hot press. In the obtained vehicle body part, aluminum that forms the plating layer is not mixed at the above-described welding point, and a high strength can be obtained by hardening in the hot press. Additionally, according to the above-described embodiment, the mask forming region can be arranged at a high accuracy. Since only aluminum can be removed, the aluminum plating layer is not left in the thickness direction, and the steel sheet portion is not removed. As described above, according to the present invention, it is possible to remove aluminum plating in a desired welding region at a desired high accuracy.

Figure 2A:
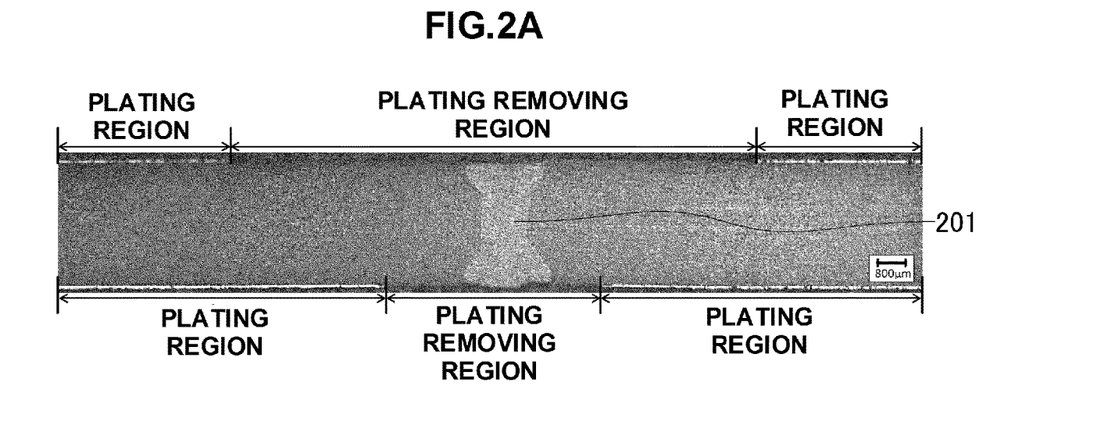
FIG. 2A is a photograph showing a cross section of a sample according to the embodiment of the present invention, which is observed by a metallurgical microscope.
Figure 2B:
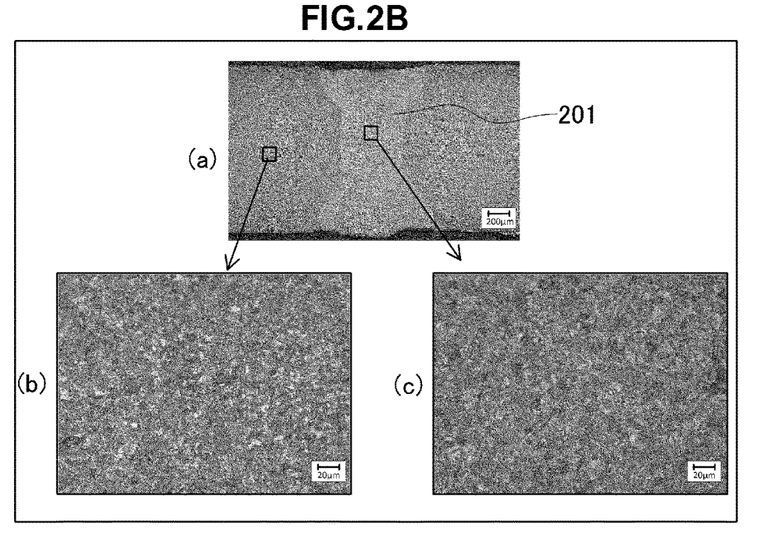
FIG. 2B shows photographs showing the cross section of the sample according to the embodiment of the present invention, which is observed by a metallurgical microscope.

An observation result of a welding point in a sample produced by the manufacturing method according to the above-described embodiment will be described here with reference to FIGS. 2A and 2B. FIGS. 2A and 2B are photographs showing a cross section of the sample observed by a metallurgical microscope. In this sample, two aluminum plated steel sheets of the same board thickness were butted against each other and laser-welded. Each aluminum plated steel sheet of the sample had a board thickness of 1.6 mm. In addition, the laser used for welding was a YAG (Yttrium Aluminum Garnet) laser. The output at the working point was 4 kW, the beam diameter at the working point was 0.45 mm, and the feed rate was 5 m/min. In addition, nitrogen gas was used as an assist gas.

Laser irradiation is performed from the upper side shown in FIG. 2A where the plating region is wider to do welding, thereby forming a welding portion 201. In FIG. 2B, (a) shows an enlarged view of the region of the welding portion 201. In FIG. 2B, (b) shows an enlarged view of the portion other than the welding portion 201. In FIG. 2B, (c) shows an enlarged view of the welding portion 201. As is apparent from comparison between (b) of FIG. 2B and (c) of FIG. 2B, a martensitic structure can be confirmed in any region. In addition, in the region of the welding portion 201, mixture of aluminum is not confirmed.

An observation result of a comparative sample formed by butting two aluminum plated steel sheets against each other and integrating them by laser welding without removing aluminum plating in the welding region will be described next with reference to FIGS. 3A and 3B. In this case as well, aluminum plated steel sheets each having a board thickness of 1.6 mm were used, and laser welding was executed as described above.

Figure 3A:
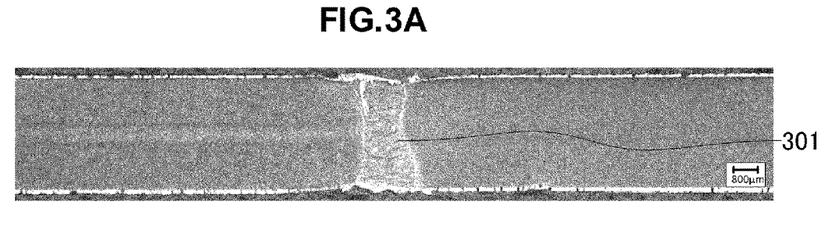
FIG. 3A is a photograph showing a cross section of a comparative sample welded without removing an aluminum plating layer, which is observed by a metallurgical microscope.
Figure 3B:
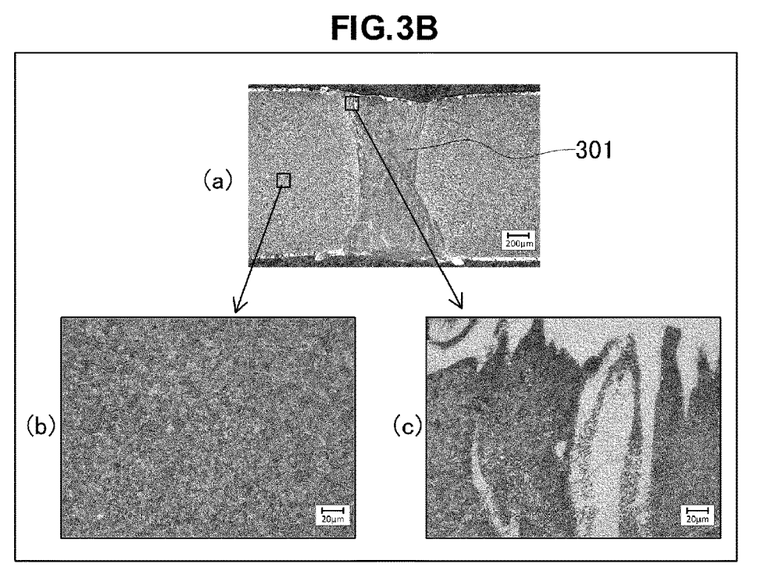
FIG. 3B shows photographs showing the cross section of the comparative sample welded without removing an aluminum plating layer, which is observed by a metallurgical microscope.

Laser irradiation is performed from the upper side shown in FIG. 3A to do welding, thereby forming a welding portion 301. In FIG. 3B, (a) shows an enlarged view of the region of the welding portion 301. In FIG. 3B, (b) shows an enlarged view of the portion other than the welding portion 301. In FIG. 3B, (c) shows an enlarged view of the welding portion 301. As is apparent from comparison between (b) of FIG. 3B and (c) of FIG. 3B, a martensitic structure can be confirmed in the region other than the welding portion 301. In the welding portion 301, however, a martensitic structure cannot be confirmed. In addition, in the region of the welding portion 301, mixture of aluminum is observed.

Figure 4A:
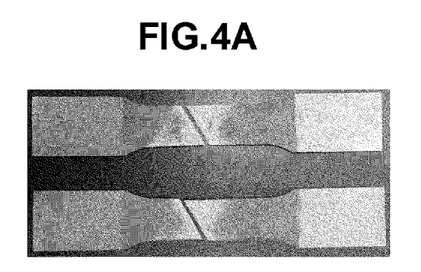
FIG. 4A is a photograph showing a ruptured state as a result of a tensile test executed for one aluminum plated steel sheet.
Figure 4B:
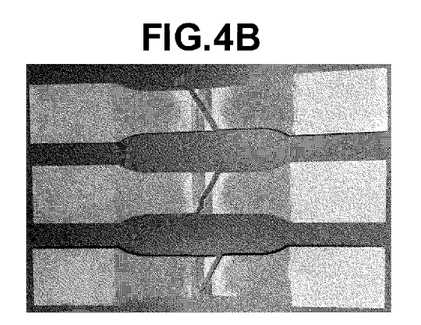
FIG. 4B is a photograph showing a ruptured state as a result of a tensile test executed for a sample according to the embodiment of the present invention.
Figure 4C:
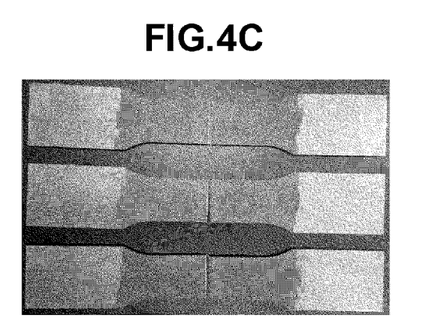
FIG. 4C is a photograph showing a ruptured state as a result of a tensile test executed for a comparative sample welded without removing an aluminum plating layer.

Results of tensile tests executed for the sample and the comparative sample described above will be described next with reference to FIGS. 4A, 4B, 4C, and 5. FIG. 4A is a photograph showing a result of a tensile test executed for one aluminum plated steel sheet. FIG. 4B is a photograph showing a result of a tensile test executed for a sample formed by integrating two aluminum plated steel sheets by the manufacturing method according to the above-described embodiment. FIG. 4C is a photograph showing a result of a tensile test executed for a sample formed by integrating two aluminum plated steel sheets by laser welding without removing aluminum plating in the welding region.

Figure 5:
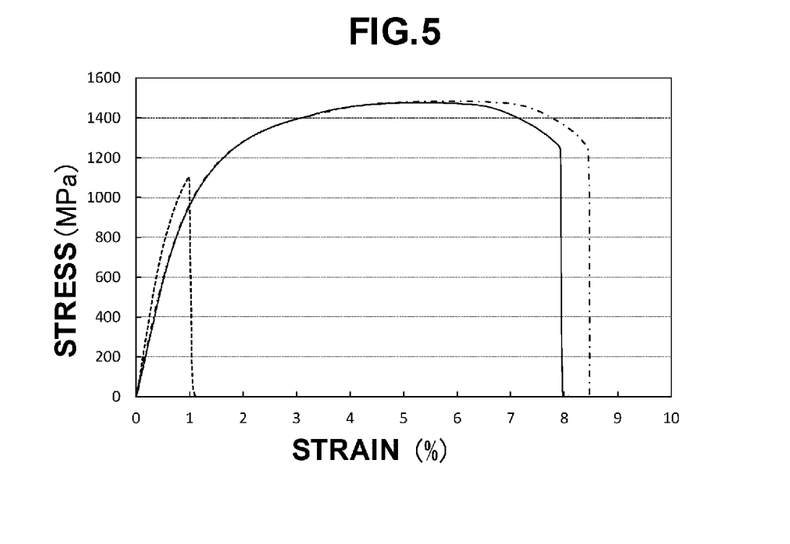
FIG. 5 is a stress-strain diagram obtained as a result of a tensile test executed for each of one aluminum plated steel sheet, the sample, and the comparative sample.

FIG. 5 is a stress-strain diagram. Referring to FIG. 5, the solid line indicates the result of the sample welded by the manufacturing method according to the present invention. The broken line indicates the result of the comparative sample welded without removing aluminum plating. In addition, the alternate long and short dashed line indicates the result of one aluminum plated steel sheet.

FIGS. 4A and 4B show the same ruptured state, and the same tensile strength is obtained in both samples. FIG. 5 shows the same result, and the same strength as in one aluminum plated steel sheet is obtained in the sample welded by the manufacturing method according to the present invention. On the other hand, the comparative sample is ruptured at the welding point, as shown in FIG. 4C. In addition, only a low strength is obtained, as shown in FIG. 5.

As described above, a desired high welding strength can be obtained by the method of welding an aluminum plated steel sheet according to the present invention.

The mask layer used to remove the plating layer made of aluminum in the welding region will be described next. For example, a masking tape can be used as the mask layer. Any masking tape using, for example, polyethylene as the material can be used.

Alternatively, a resist may be applied and used as the mask layer. The resist is applied to a predetermined region by, for example, dipping, spray coating, screen printing, or the like and used as the mask layer. A resist made of a resin is applied to the entire region of a target aluminum plated steel sheet. Next, the resist film in a desired welding region is removed by an organic solvent or the like, thereby exposing the welding region. After that, the aluminum plating layer in the exposed welding region is dissolved and removed by an alkaline solution.

Otherwise, a photosensitive resist may be used. For example, a novolac-based photoresist using diazonaphthoquinone as a photosensitive agent can be used. This photoresist is applied to the entire region of a target aluminum plated steel sheet. After that, a desired welding region is exposed. Next, the photoresist layer is developed by an alkaline solution, thereby exposing the welding region. When the alkaline solution is then made to act, the aluminum plating layer in the welding region exposed by the development can be dissolved and removed.

Figure 6:
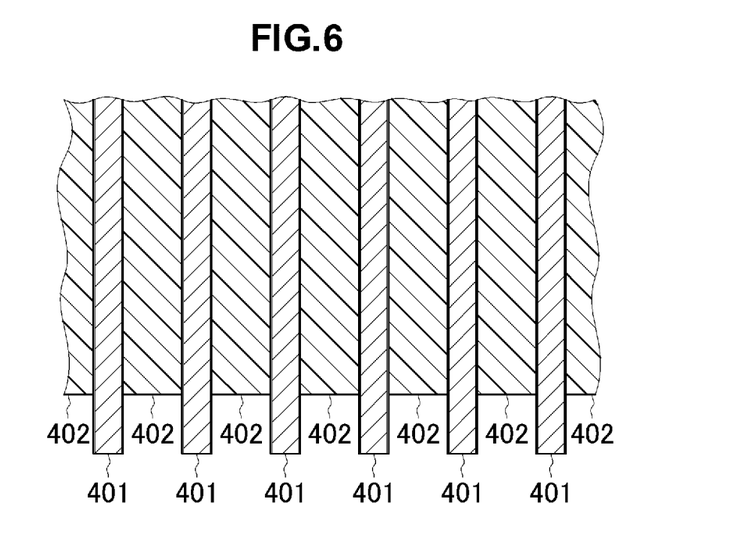
FIG. 6 is a view showing a state in each step so as to explain some steps of another method of welding an aluminum plated steel sheet according to the embodiment of the present invention.

Additionally, as shown in FIG. 6, spacers 402 arranged between a plurality of aluminum plated steel sheets 401 as the processing target can be used as masks. The spacers 402 are arranged between the aluminum plated steel sheets 401.

The spacers 402 are made to abut against regions other than the plating removing regions (welding regions) and bundled. In this state, some spacers 402 are immersed in an alkaline solution up to partial regions including the plating removing regions. This makes it possible to execute processing for a number of aluminum plated steel sheets by one process. In addition, when the welding region is linear, the spacer need not have a complex shape, and the processing can be executed particularly easily.

The mask may be made of wax such as paraffin. For example, a part of the aluminum plated steel sheet as the processing target is immersed in a heated and dissolved paraffin solution and pulled up, thereby applying the paraffin solution to a region from an end of the aluminum plated steel sheet up to a predetermined position and forming a paraffin layer. When the aluminum plated steel sheet is pulled up, the paraffin layer formed on the part of the aluminum plated steel sheet is cooled and solidified, and a state in which the paraffin layer is fixed to the aluminum plated steel sheet is maintained.

Next, the paraffin layer in the welding region is removed. For example, when a cut is formed on the boundary line between the paraffin layer and the welding region using a cutter or the like, the paraffin layer in the welding region peels off from the aluminum plated steel sheet.

After that, a predetermined region of the aluminum plated steel sheet including the welding region is immersed in an alkaline solution such as an aqueous solution of sodium hydroxide of a predetermined concentration, thereby dissolving and removing the aluminum plating layer in the welding region. Since the region in which the paraffin layer is formed does not come into contact with the alkaline solution, and the aluminum plating layer in this region is not removed, only the aluminum plating layer in the welding region is removed by the above-described processing.

The paraffin used need only maintain the solid state at the temperature of the above-described dissolving/removing processing and have a melting point of, for example, about 60° C.

Figure 7:
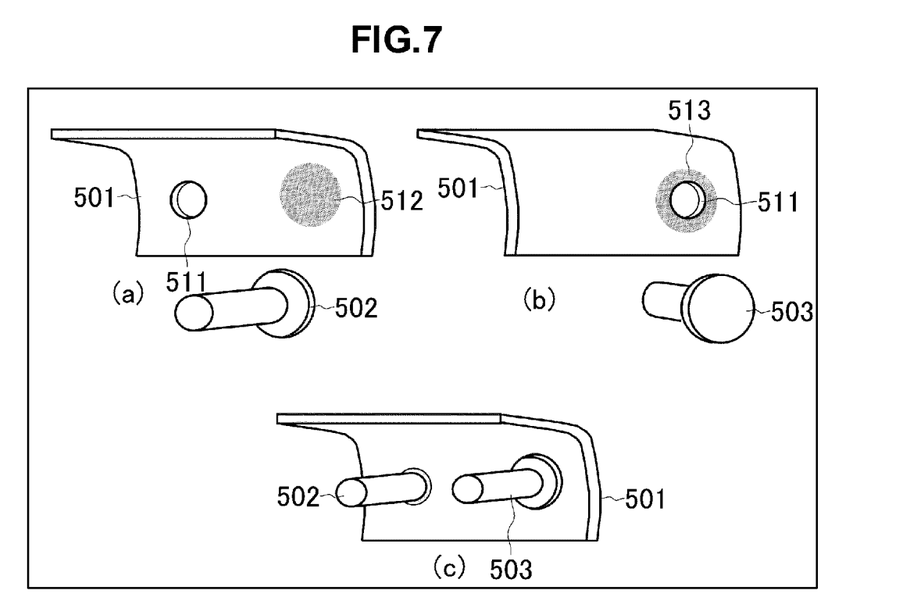
FIG. 7 is a perspective view for explaining the other method of welding an aluminum plated steel sheet according to the embodiment of the present invention.

A case in which welding is performed by laser welding has been described above as an example. However, the present invention is not limited to this. For example, another welding method such as spot (resistance heating) welding or arc welding may be used. In addition, a case in which the ends of aluminum plated steel sheets are butted against each other and welded has been described above as an example. However, the present invention is not limited to this. For example, the present invention is also applicable to a case in which bolts 502 and 503 made of steel are welded to an aluminum plated steel sheet 501 formed into a predetermined shape, as shown in (a) and (b) of FIG. 7. Aluminum plating at a welding point 512 of the aluminum plated steel sheet 501 where the head of the bolt 502 is to be welded is selectively dissolved and removed by an alkaline solution. In this state, the head of the bolt 502 is welded to the welding point 512, as shown in (c) of FIG. 7. This can prevent mixing of aluminum in the welding portion and prevent lowering of the strength at the welding point.

In addition, aluminum plating in a welding region 513 on the periphery of a screw hole 511 through which a screw portion extends is selectively dissolved and removed by an alkaline solution. In this state, the screw portion base region of the head of the bolt 503 is welded to the welding point 513, as shown in (c) of FIG. 7. This can prevent mixing of aluminum in the welding portion and prevent lowering of the strength at the welding point.

Figure 8:
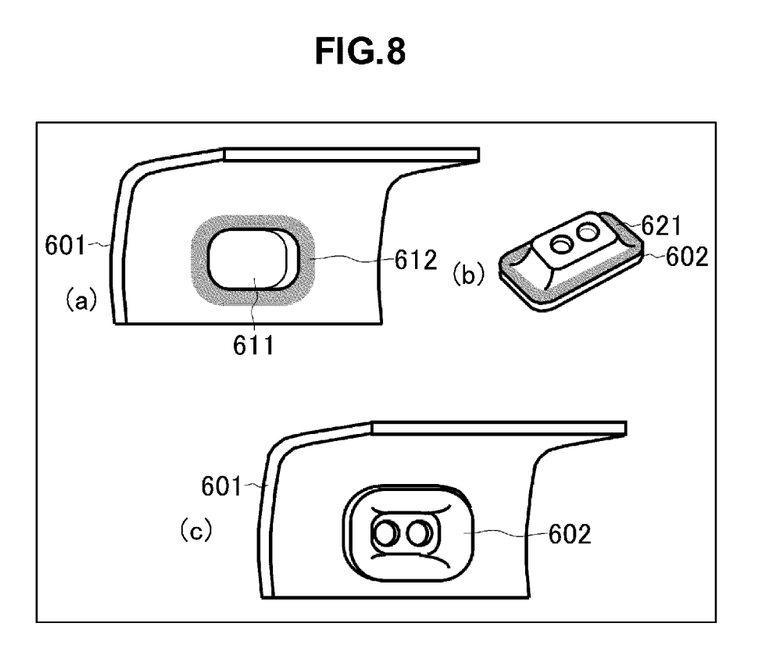
FIG. 8 is a perspective view for explaining the other method of welding an aluminum plated steel sheet according to the embodiment of the present invention.

Additionally, the present invention is also applicable to a case in which a hole portion 611 is formed by punching or the like in an aluminum plated steel sheet 601 formed into a predetermined shape, as shown in (a) of FIG. 8, and a small part 602 made aluminum plated steel as shown in (b) of FIG. 8 is welded to there. The aluminum plating layer at a welding point 612 of the aluminum plated steel sheet 601 is selectively dissolved and removed by an alkaline solution. In addition, the aluminum plating layer at a welding point 621 of the small part 602 is selectively dissolved and removed by an alkaline solution. When the regions in which the aluminum plating layers are dissolved and removed in the above-described way are welded to each other, as shown in (c) of FIG. 8, lowering of the strength at the welding point can be prevented.

As described above, according to the present invention, a plating layer made of aluminum in the welding region of an aluminum plated steel sheet is removed by an alkaline solution. It is therefore possible to enable welding in a state in which aluminum plating in a desired welding region is removed at a desired high accuracy.

Note that the present invention is not limited to the embodiment described above, and many modifications and combinations can be made by those who have ordinary knowledge in this field within the technical scope of the present invention, as a matter of course. For example, an aqueous solution of sodium hydroxide has been exemplified as an alkaline solution. However, the present invention is not limited to this, and any other alkaline solution such as an aqueous solution of potassium hydroxide may be used, as a matter of course.

Explanation of the Reference Numerals and Signs

101 . . . aluminum plated steel sheet, 101a . . . preprocessed aluminum plated steel sheet, 102 . . . steel sheet, 103, 104 . . . plating layer, 105, 106 . . . mask layer, 107 . . . end, 121 . . . aluminum plated steel sheet (another member), 121a . . . preprocessed aluminum plated steel sheet, 122 . . . steel sheet, 123, 124 . . . plating layer, 125, 126 . . . mask layer, 127 . . . end, 131 . . . welding portion, 151, 152, 153, 154 . . . welding region

The invention claimed is:

1. A method of welding an aluminum plated steel sheet, comprising:

the first step of forming a preprocessed aluminum plated steel sheet in which a plating layer made of aluminum in a welding region is removed by an alkaline solution; and the second step of welding another member made of steel to the welding region of the preprocessed aluminum plated steel sheet to integrate the member and the preprocessed aluminum plated steel sheet, wherein the first step includes:

arranging masks between a plurality of separate aluminum plated steel sheets as spacers;

bundling the plurality of separate aluminum plated steel sheets and the masks arranged therebetween, the masks being made to abut against regions other than plating removing regions of the respective aluminum plated steel sheets; and removing plating layers in the plating removing regions of the aluminum plated steel sheets by immersing in an alkaline solution partial regions, including the plating removing regions, of the aluminum plated steel sheets, wherein the preprocessed aluminum plated steel sheet is one of the aluminum plated steel sheets, the plating layers of which have been removed in the plating removing regions by the alkaline solution, and the plating removing region of the one of the aluminum plated steel sheets includes the welding region of the preprocessed aluminum plated steel sheet.

2. The method of welding the aluminum plated steel sheet according to claim 1, wherein the masks are made of wax.

3. The method of welding the aluminum plated steel sheet according to claim 1, wherein in the first step, a first preprocessed aluminum plated steel sheet in which the plating layer in the welding region of a first aluminum plated steel sheet is removed by the alkaline solution is formed, and a second preprocessed aluminum plated steel sheet in which the plating layer in the welding region of a second aluminum plated steel sheet that is the other member is removed by the alkaline solution is formed, and in the second step, the welding regions of the first preprocessed aluminum plated steel sheet and the second preprocessed aluminum plated steel sheet are butted against each other and welded by laser welding, thereby forming a tailored welded blank in which the first preprocessed aluminum plated steel sheet and the second preprocessed aluminum plated steel sheet are integrated.

* * * * *